(12) United States Patent
Chen et al.

(10) Patent No.: US 11,914,875 B2
(45) Date of Patent: Feb. 27, 2024

(54) STORAGE WORKLOAD ALLOCATION BASED ON INPUT/OUTPUT PATTERN AFFINITY CALCULATIONS

(71) Applicant: Dell Products L.P., Round Rock, TX (US)

(72) Inventors: Chi Chen, Chengdu (CN); Hailan Dong, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 17/860,188

(22) Filed: Jul. 8, 2022

(65) Prior Publication Data

US 2023/0418489 A1    Dec. 28, 2023

(30) Foreign Application Priority Data

Jun. 23, 2022   (CN) .......................... 202210719865.8

(51) Int. Cl.
*G06F 3/06* (2006.01)
(52) U.S. Cl.
CPC ............ *G06F 3/0635* (2013.01); *G06F 3/067* (2013.01); *G06F 3/0613* (2013.01); *G06F 3/0631* (2013.01)
(58) Field of Classification Search
CPC ...... G06F 3/061; G06F 3/0611; G06F 3/0613; G06F 3/0631; G06F 3/0635; G06F 3/067; G06F 3/0671
USPC ...................... 710/74; 711/154; 718/104, 105
See application file for complete search history.

(56) References Cited

U.S. PATENT DOCUMENTS

| 11,762,562 B2* | 9/2023 | Masuda ............... G06F 11/3409 |
| | | 711/154 |
| 2017/0206015 A1* | 7/2017 | Zhuang ................. G06F 3/0685 |
| 2022/0229560 A1* | 7/2022 | Dar ....................... G06F 3/0653 |

OTHER PUBLICATIONS

NVM Express, "NVM Express, Revision 1.3," NVM Express, May 1, 2017, 282 pages.
Dell EMC, "Dell EMC VMAX3 Family," Data Sheet, Nov. 2016, 8 pages.
Dell Technologies, "Dell EMC VMAX All Flash: Family Overview," Technical White Paper, Sep. 2020, 40 pages.

(Continued)

*Primary Examiner* — Ilwoo Park
(74) *Attorney, Agent, or Firm* — Ryan, Mason & Lewis, LLP

(57) ABSTRACT

An apparatus comprises a processing device configured to identify storage workloads to be run on a storage system, and to determine a mix of input/output (TO) patterns associated with the identified storage workloads, the mix of IO patterns comprising a first set of IO patterns characterizing types of IO operations performed by a first storage workload and at least a second set of IO patterns characterizing types of IO operations performed by a second storage workload. The processing device is also configured to calculate an affinity metric for the mix of IO patterns, the calculated affinity metric characterizing a difference between (i) performance metrics for the mix of IO patterns running concurrently and (ii) the first and second sets of IO patterns running individually. The processing device is further configured to allocate the identified storage workloads to storage devices of the storage system based on the calculated affinity metric.

20 Claims, 22 Drawing Sheets

(56) References Cited

OTHER PUBLICATIONS

Dell Technologies, "Dell EMC Unity: Unisphere Overview," Technical White Paper, Feb. 2020, 41 pages.
EMC2, "FAST.X with EMC CloudArray," White Paper, Sep. 2015, 11 pages.
Dell EMC "Dell EMC VMAX All Flash and VMAX3: Reliability, Availability, and Serviceability," Technical White Paper, Dec. 2020, 57 pages.

* cited by examiner

| GROUP 2 PATTERN TYPE | $P_{k=1}$ 0.5K_100W_100S | $P_{k=2}$ 64K_10W_100S | $P_{k=3} (L_{mix})$ 0.5K/64K_100W/10W_100S | $L_{avg}$ Avg | $D_r$ | $D_e$ |
|---|---|---|---|---|---|---|
| RESPONSE TIME | 0.540281735 | 0.021640231 | 0.438078034 | 0.280961 | 1.091841 | 0.80692 |
| IOPS | 0.535367967 | 0.024976822 | 0.439655211 | 0.280172 | | |
| BANDWIDTH | 0.021161686 | 0.128677453 | 0.850160861 | 0.07492 | | |

STORAGE WORKLOAD ALLOCATION BASED ON INPUT/OUTPUT PATTERN AFFINITY CALCULATIONS

RELATED APPLICATION

The present application claims priority to Chinese Patent Application No. 202210719865.8, filed on Jun. 23, 2022 and entitled "Storage Workload Allocation Based on Input/Output Pattern Affinity Calculations," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for storage workload allocation based at least in part on input/output pattern affinity calculations.

In one embodiment, an apparatus comprises at least one processing device comprising a processor coupled to a memory. The at least one processing device is configured to perform the steps of identifying a set of storage workloads to be run on a storage system, the storage system comprising a plurality of storage devices, and determining a mix of input/output patterns associated with two or more storage workloads in the identified set of storage workloads, the mix of input/output patterns comprising a first set of one or more input/output patterns characterizing types of input/output operations performed by a first one of the two or more storage workloads in the identified set of storage workloads and at least a second set of one or more input/output patterns characterizing types of input/output operations performed by a second one of the two or more storage workloads in the identified set of storage workloads. The at least one processing device is also configured to perform the step of calculating an affinity metric for the mix of input/output patterns associated with the two or more storage workloads in the identified set of storage workloads, the calculated affinity metric characterizing a difference between performance metrics for (i) the mix of input/output patterns running concurrently and (ii) the first and second sets of one or more input/output patterns running individually. The at least one processing device is further configured to perform the step of allocating the two or more storage workloads in the identified set of storage workloads to one or more of the plurality of storage devices of the storage system based at least in part on the calculated affinity metric.

These and other illustrative embodiments include, without limitation, methods, apparatus, networks, systems and processor-readable storage media.

BRIEF DESCRIPTION OF THE DRAWINGS

FIGS. 9A and 9B show a table and plot of input/output pattern affinity metrics for another mix of input/output patterns in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
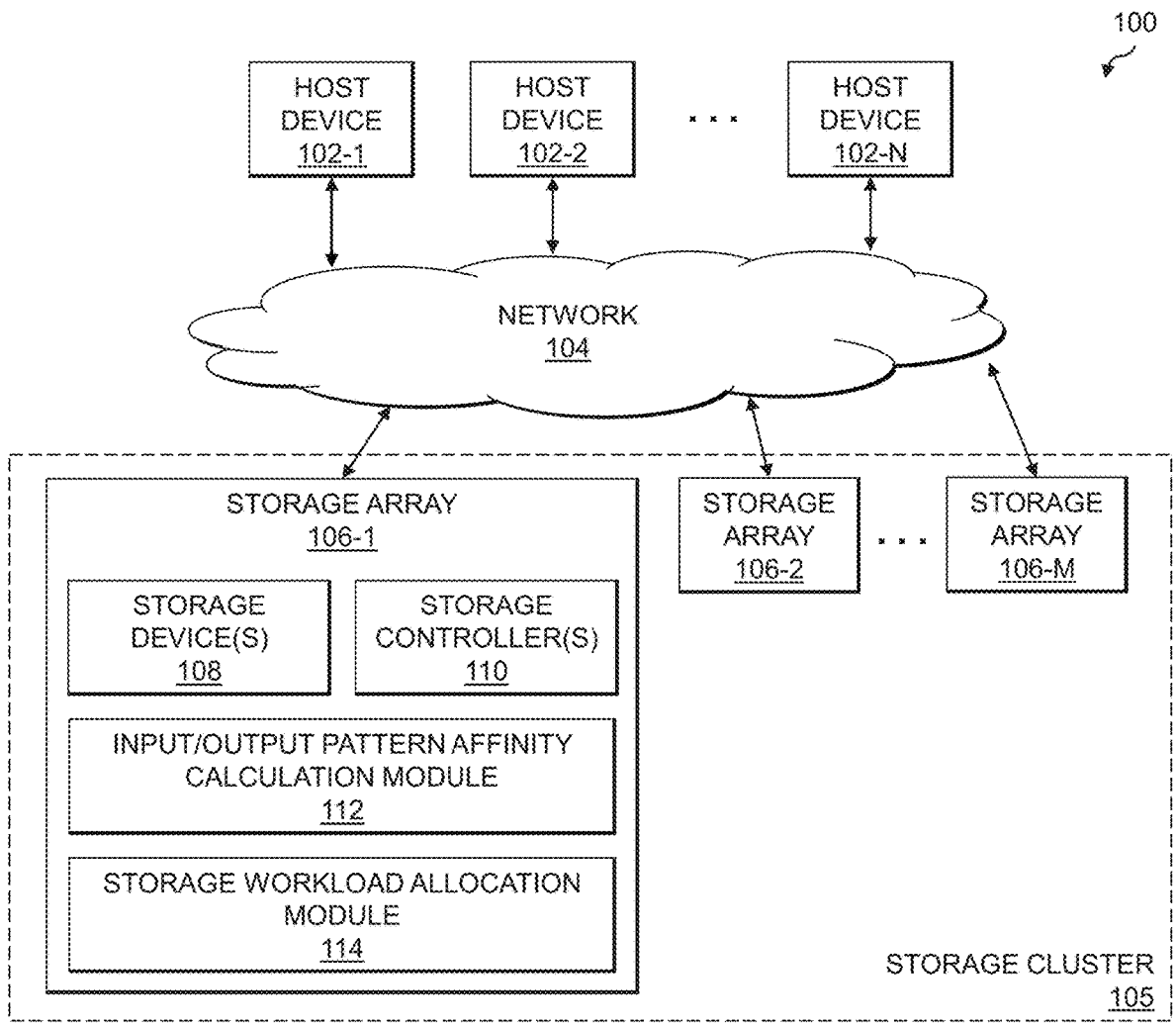
FIG. 1 is a block diagram of an information processing system for storage workload allocation based at least in part on input/output pattern affinity calculations in an illustrative embodiment.

FIG. 1 shows an information processing system 100 configured in accordance with an illustrative embodiment to provide functionality for storage workload allocation based at least in part on input/output (IO) pattern affinity calculations. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (TO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit TO operations (e.g., as part of storage workloads of one or more applications running on the host devices 102) to be processed by the storage cluster 105. At least one of the storage controllers of the storage arrays 106 (e.g., the storage controller 110 of storage array 106-1) is assumed to implement functionality for intelligent storage workload allocation across the storage devices 108 of the storage array 106-1 (e.g., between different ones of the storage devices 108 or portions thereof, where in some cases the different storage devices 108 are part of or provide storage resources for different storage tiers in the storage cluster 105), and between the storage array 106-1 and one or more other ones of the storage arrays 106-2 through 106-M. Such intelligent storage workload allocation functionality is provided via an IO pattern affinity calculation module 112 and a storage workload allocation module 114.

The IO pattern affinity calculation module 112 is configured to identify a set of storage workloads to be run on a storage system (e.g., the storage array 106-1, the storage cluster 105). The IO pattern affinity calculation module 112 is also configured to determine a mix of IO patterns associated with two or more storage workloads in the identified set of storage workloads. The mix of IO patterns comprises a first set of one or more IO patterns characterizing types of IO operations performed by a first one of the two or more storage workloads in the identified set of storage workloads and at least a second set of one or more IO patterns characterizing types of IO operations performed by a second one of the two or more storage workloads in the identified set of storage workloads. The IO pattern affinity calculation module 112 is further configured to calculate an affinity metric for the mix of IO patterns associated with the two or more storage workloads in the identified set of storage workloads. The calculated affinity metric characterizes a difference between performance metrics for (i) the mix of IO patterns running concurrently and (ii) the first and second sets of one or more IO patterns running individually. The storage workload allocation module 114 is configured to allocate the two or more storage workloads in the identified set of storage workloads to one or more of the plurality of storage devices of the storage system based at least in part on the calculated affinity metric.

Although in the FIG. 1 embodiment the IO pattern affinity calculation module 112 and the storage workload allocation module 114 are shown as being implemented internal to the storage array 106-1 and outside the storage controllers 110, in other embodiments one or both of the IO pattern affinity calculation module 112 and the storage workload allocation module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the IO pattern affinity calculation module 112 and the storage workload allocation module 114.

At least portions of the functionality of the IO pattern affinity calculation module 112 and the storage workload allocation module 114 may be implemented at least in part in the form of software that is stored in memory and executed by a processor.

As noted above, the storage arrays 106 in some embodiments are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D)(Point™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for storage workload allocation based at least in part on IO pattern affinity calculations is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
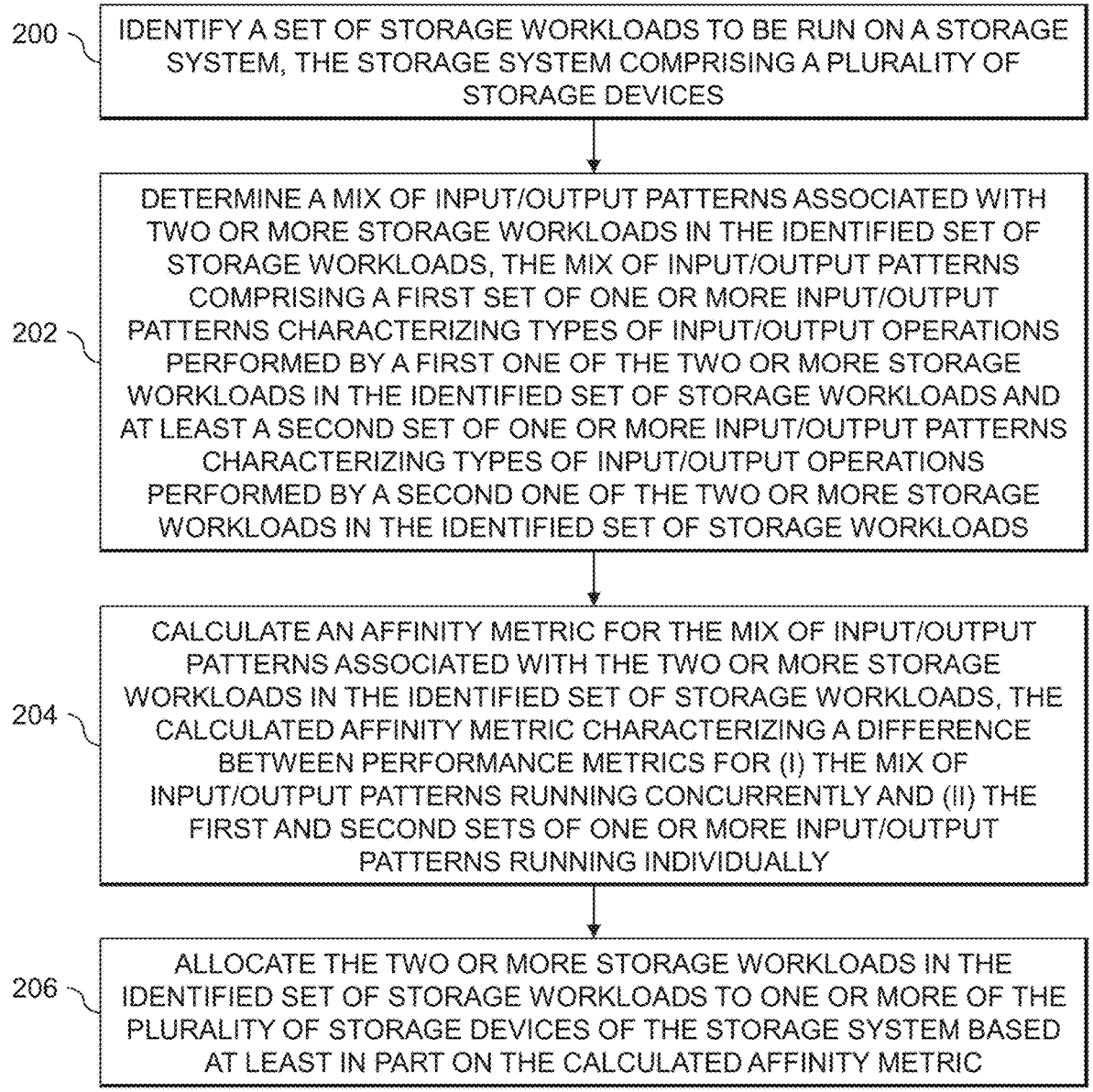
FIG. 2 is a flow diagram of an exemplary process for storage workload allocation based at least in part on input/output pattern affinity calculations in an illustrative embodiment.

An exemplary process for storage workload allocation based at least in part on IO pattern affinity calculations will now be described in more detail with reference to the flow diagram of FIG. 2. It is to be understood that this particular process is only an example, and that additional or alternative processes for storage workload allocation based at least in part on IO pattern affinity calculations may be used in other embodiments.

In this embodiment, the process includes steps 200 through 206. These steps are assumed to be performed by the IO pattern affinity calculation module 112 and the storage workload allocation module 114. The process begins with step 200, identifying a set of storage workloads to be run on a storage system, the storage system comprising a plurality of storage devices. A mix of IO patterns associated with two or more storage workloads in the identified set of storage workloads is determined in step 202. The mix of IO patterns comprises a first set of one or more IO patterns characterizing types of IO operations performed by a first one of the two or more storage workloads in the identified set of storage workloads and at least a second set of one or more IO patterns characterizing types of IO operations performed by a second one of the two or more storage workloads in the identified set of storage workloads. A given IO pattern associated with a given one of the two or more storage workloads in the identified set of storage workloads characterizes: a size of storage objects stored by the given storage workload; a ratio of read operations to write operations for storage objects stored by the given storage workload; and a ratio of sequential IO operations to random IO operations involving storage objects stored by the given storage workload.

In step 204, an affinity metric for the mix of IO patterns associated with the two or more storage workloads in the identified set of storage workloads is calculated. The calculated affinity metric characterizes a difference between performance metrics for (i) the mix of IO patterns running concurrently and (ii) the first and second sets of one or more IO patterns running individually. The two or more storage workloads in the identified set of storage workloads are allocated to one or more of the plurality of storage devices of the storage system based at least in part on the calculated affinity metric.

In some embodiments, step 204 comprises determining normalized values for two or more different types of performance criteria for the mix of IO patterns, determining normalized values for each of the IO patterns in the mix of IO patterns, and determining averages of the normalized values for the two or more different types of performance criteria for each of the IO patterns in the mix of IO patterns. The two or more different types of performance criteria may comprise response time, IO operations per second (IOPS) and bandwidth. Step 204 may further comprise computing a distance between: the normalized values for the two or more different types of performance criteria for the mix of IO patterns; and the determined averages of the normalized values for the two or more different types of performance criteria for each of the IO patterns in the mix of IO patterns. The computed distance may comprise a distance between a first point in an N-dimensional space corresponding to the normalized values for the two or more different types of performance criteria for the mix of IO patterns and a second point in the N-dimensional space corresponding to the determined averages of the normalized values for the two or more different types of performance criteria for each of the IO patterns in the mix of IO patterns, where N is the number of the two or more different types of performance criteria. The computed distance may also or alternatively comprise a Euclidean distance metric.

In some embodiments, the calculated affinity metric comprises a first component characterizing whether the mix of IO patterns provides a performance increase or a performance decrease, and a second component characterizing a quantity of the performance increase or the performance decrease. Step 206 may comprise determining whether to modify an existing allocation of the two or more storage workloads in the identified set of storage workloads based at least in part on whether the second component of the calculated affinity metric exceeds a designated threshold. Responsive to determining that the second component of the calculated affinity metric exceeds the designated threshold and the first component of the calculated affinity metric indicates that the mix of IO patterns provides the performance increase, step 206 may comprise modifying the existing allocation of the two or more storage workloads in the identified set of storage workloads to allocate the two or more storage workloads in the identified set of storage workloads to a same subset of the plurality of storage devices of the storage system. Responsive to determining that the second component of the calculated affinity metric exceeds the designated threshold and the first component of the calculated affinity metric indicates that the mix of IO patterns provides the performance decrease, step 206 may comprise modifying the existing allocation of the two or more storage workloads in the identified set of storage workloads to allocate the two or more storage workloads in the identified set of storage workloads to two or more different subsets of the plurality of storage devices of the storage system. Responsive to determining that the second component of the calculated affinity metric does not exceed the designated threshold, step 206 may comprise maintaining the existing allocation of the two or more storage workloads in the identified set of storage workloads.

The plurality of storage devices of the storage system may be arranged in two or more storage tiers, and step 206 may comprise selecting whether to allocate the two or more storage workloads in the identified set of storage workloads to the same or different ones of the two or more storage tiers. The storage system may comprise a clustered storage system comprising two or more storage arrays, and step 206 may comprise selecting whether to allocate the two or more storage workloads in the identified set of storage workloads to the same or different ones of the two or more storage arrays in the clustered storage system.

Storage systems usually need to provide services for multiple applications or storage workloads. Different applications with different IO patterns may flush or store data to storage devices (e.g., SAS Flash, SAS, Near Line SAS (NL-SAS), etc.) at the same or similar time. In some cases, the mix of IO patterns associated with multiple applications results in increased storage system performance. In other cases, the mix of IO patterns associated with multiple applications results in decreased storage system performance. Illustrative embodiments provide techniques for analyzing the affinity of different mixes of IO patterns. For mixed IO patterns with high affinity, those IO patterns when mixed improve the storage system's performance. For mixed IO patterns with low affinity, those IO patterns when mixed degrade the storage system's performance (e.g., such that they are not suitable for putting together to the same storage device or group of storage devices). IO pattern affinity may be used to guide the IO flows of multiple applications to improve storage system performance (e.g., to the same disk or storage device, to different disks or storage devices, etc.).

Figure 3:
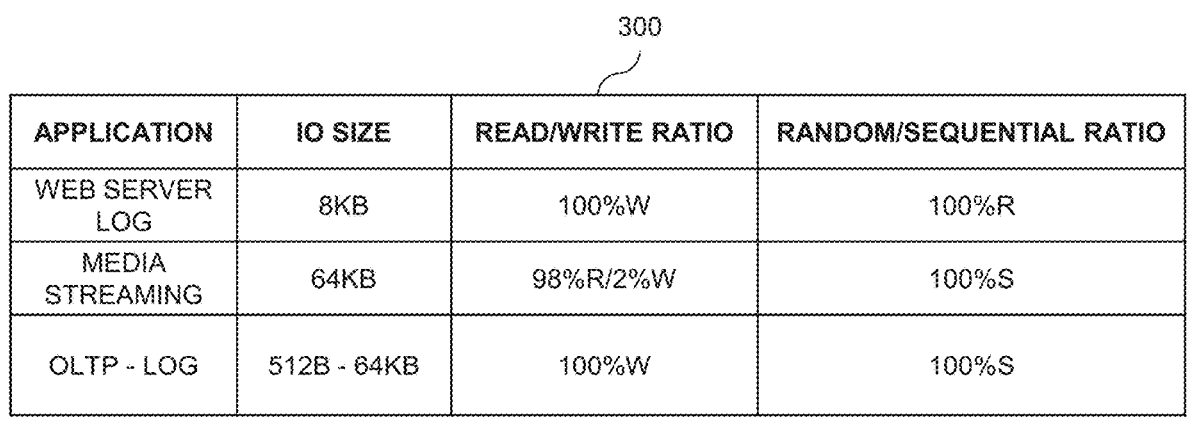
FIG. 3 shows a table of characteristics of different storage workloads in an illustrative embodiment.

Different applications may run storage workloads having varying IO characteristics. Thus, to analyze and tune performance of a storage system, it is important to understand the types of storage workloads that applications or hosts utilizing the storage system are generating. Storage workloads may be described in terms of various characteristics, including but not limited to IO size, read/write ratio, random/sequential ratio, etc. Different applications, such as a web file server, a web server log, operating system (OS) paging, exchange server, workstation, media streaming, online transaction processing (OLTP) data, and OLTP logging, may have different storage workloads. FIG. 3 shows a table 300 illustrating different characteristics (IO size, read/write ratio and random/sequential ratio) for web server logging, media streaming and OLTP logging applications. The web server logging application, for example, may have an IO size of 8 kilobytes (KB), a read/write ratio of 100% read, and a random/sequential ratio of 100% random. The media streaming application has an IO size of 64 KB, a read/write ratio of 98% read and 2% write, and a random/sequential ratio of 100% sequential. The OLTP logging application has an IO size of 512 bytes (B) to 64 KB, a read/write ratio of 100% write, and a random/sequential ratio of 100% sequential. It should be noted that these particular applications and their associated storage workload characteristics are presented by way of example only, and that in other embodiments there may be various other types of applications with different values for their associated storage workload characteristics.

FIGS. 4A-4E and 5A-5E illustrate different groups of applications with associated storage workloads and mixes of IO patterns.

Figure 4A:
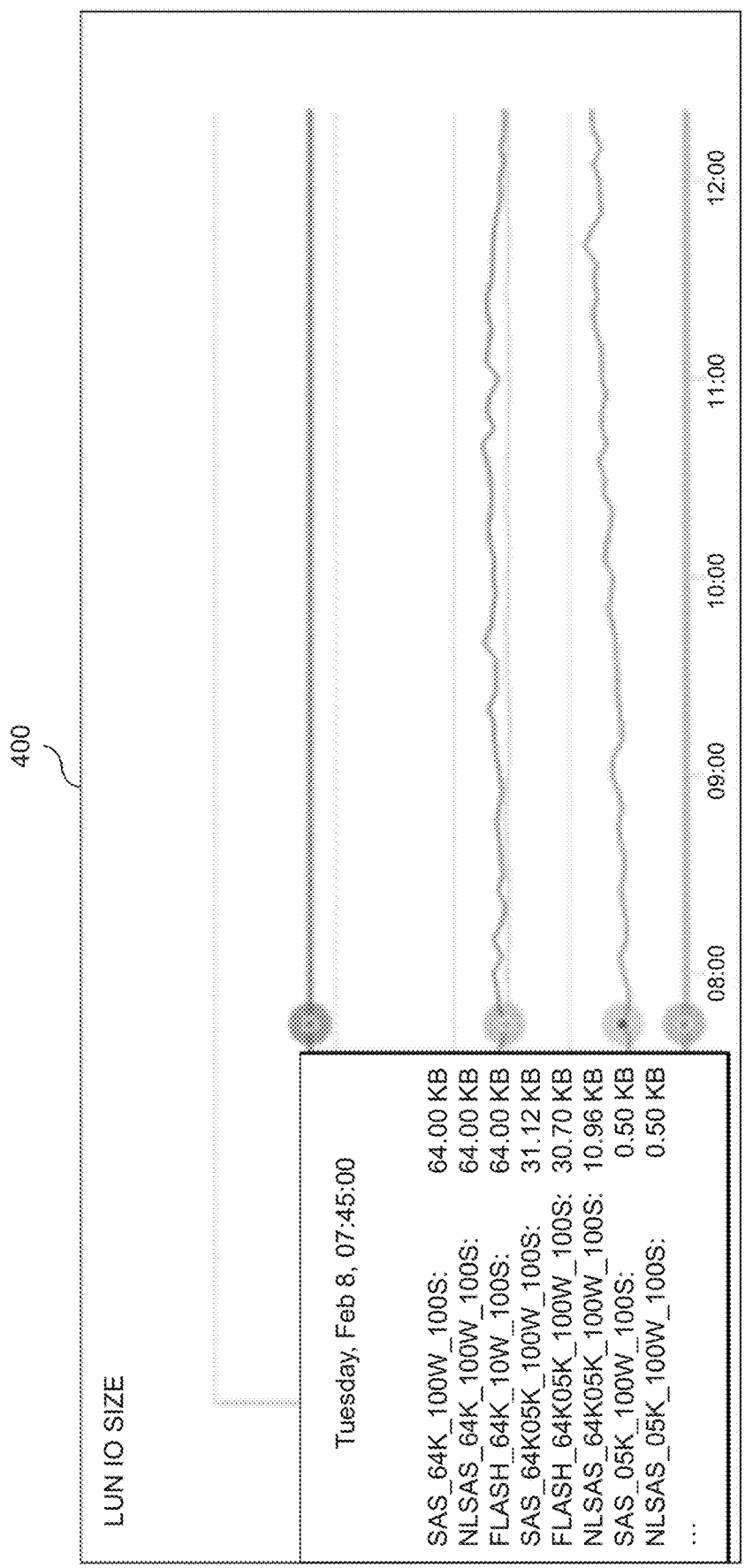
FIGS. 4A-4E show plots and a table of different performance metrics for a mix of input/output patterns on different storage tiers in an illustrative embodiment.
Figure 4B:
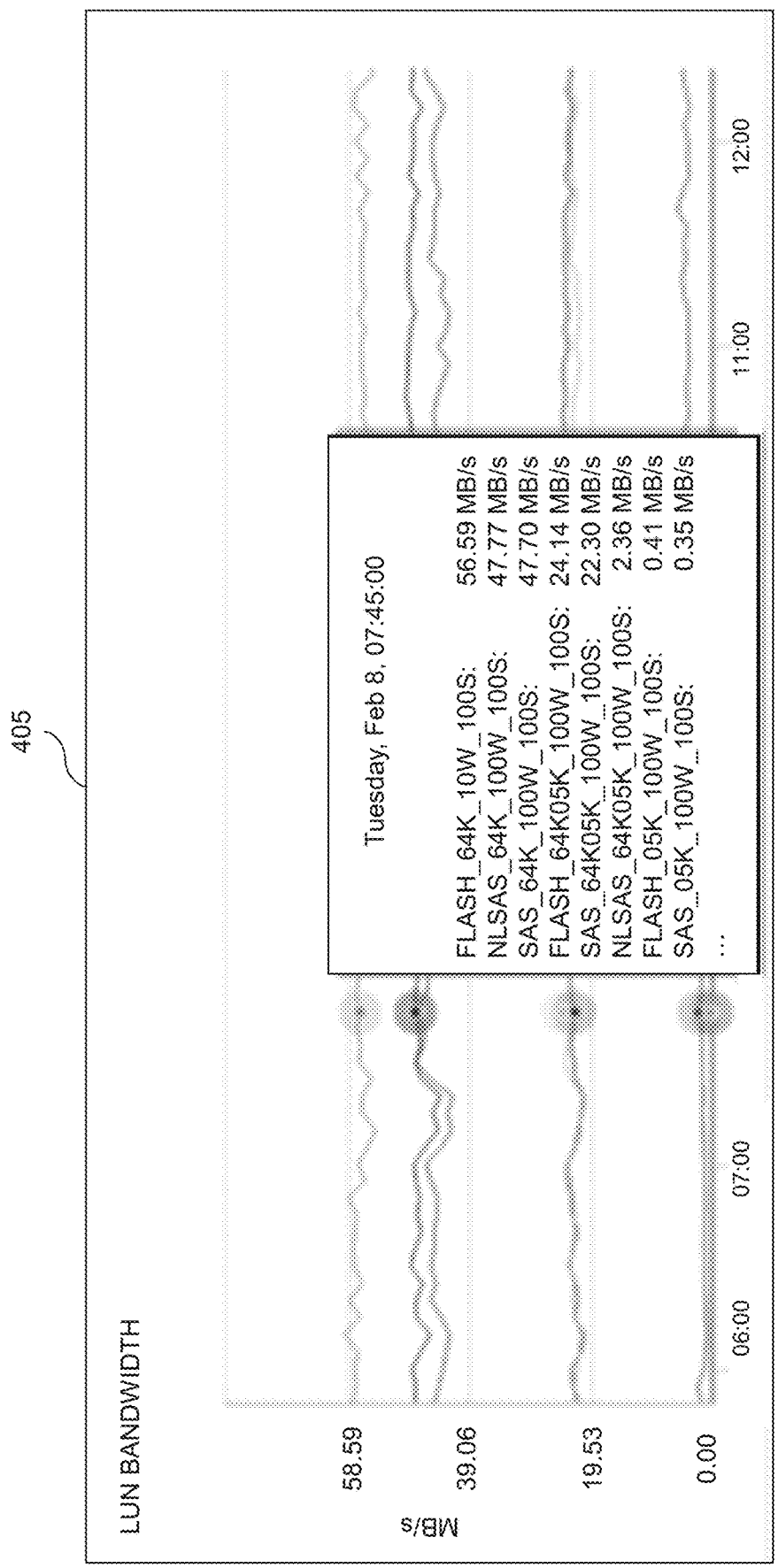
Figure 4C:
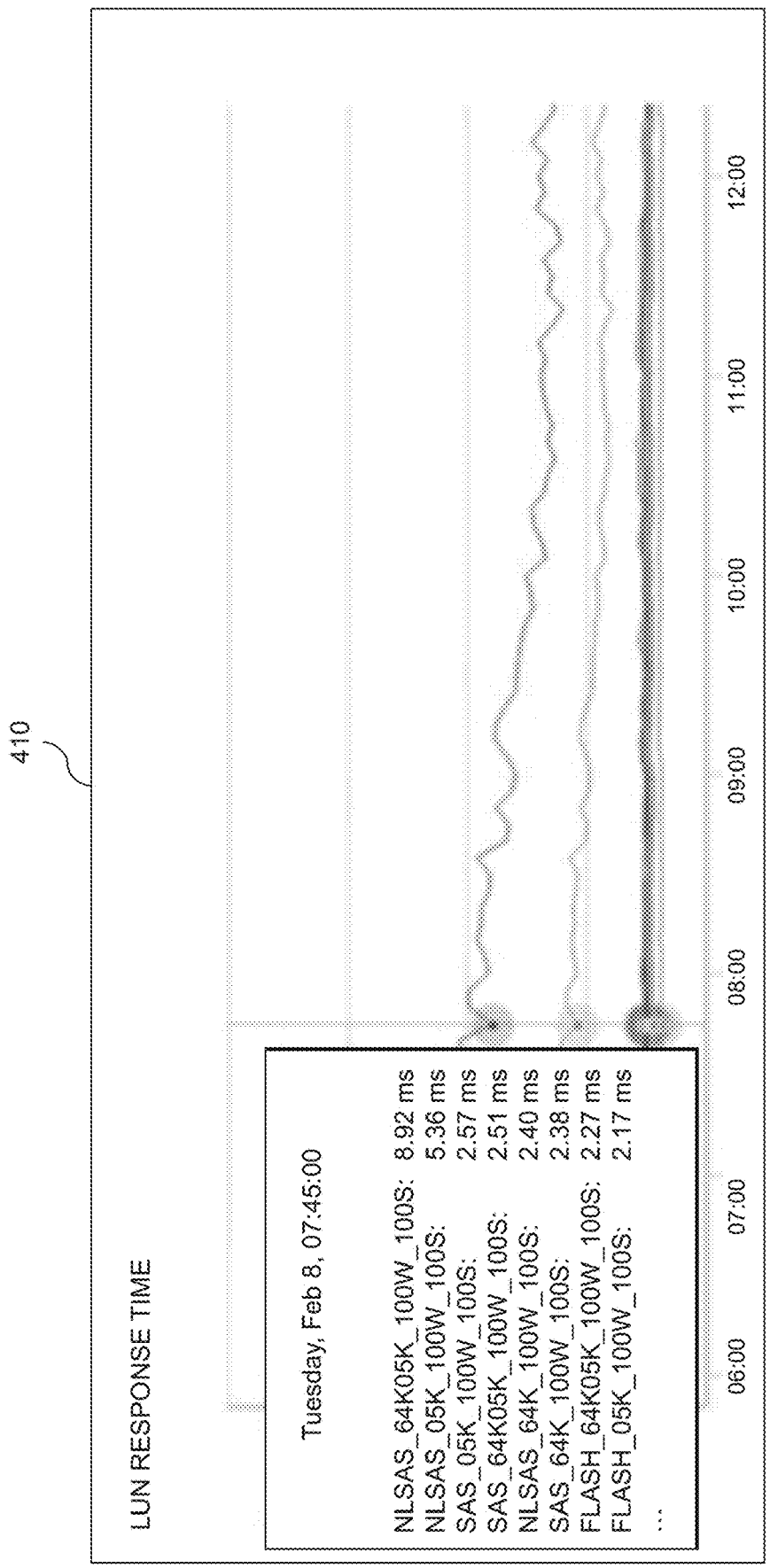
Figure 4D:
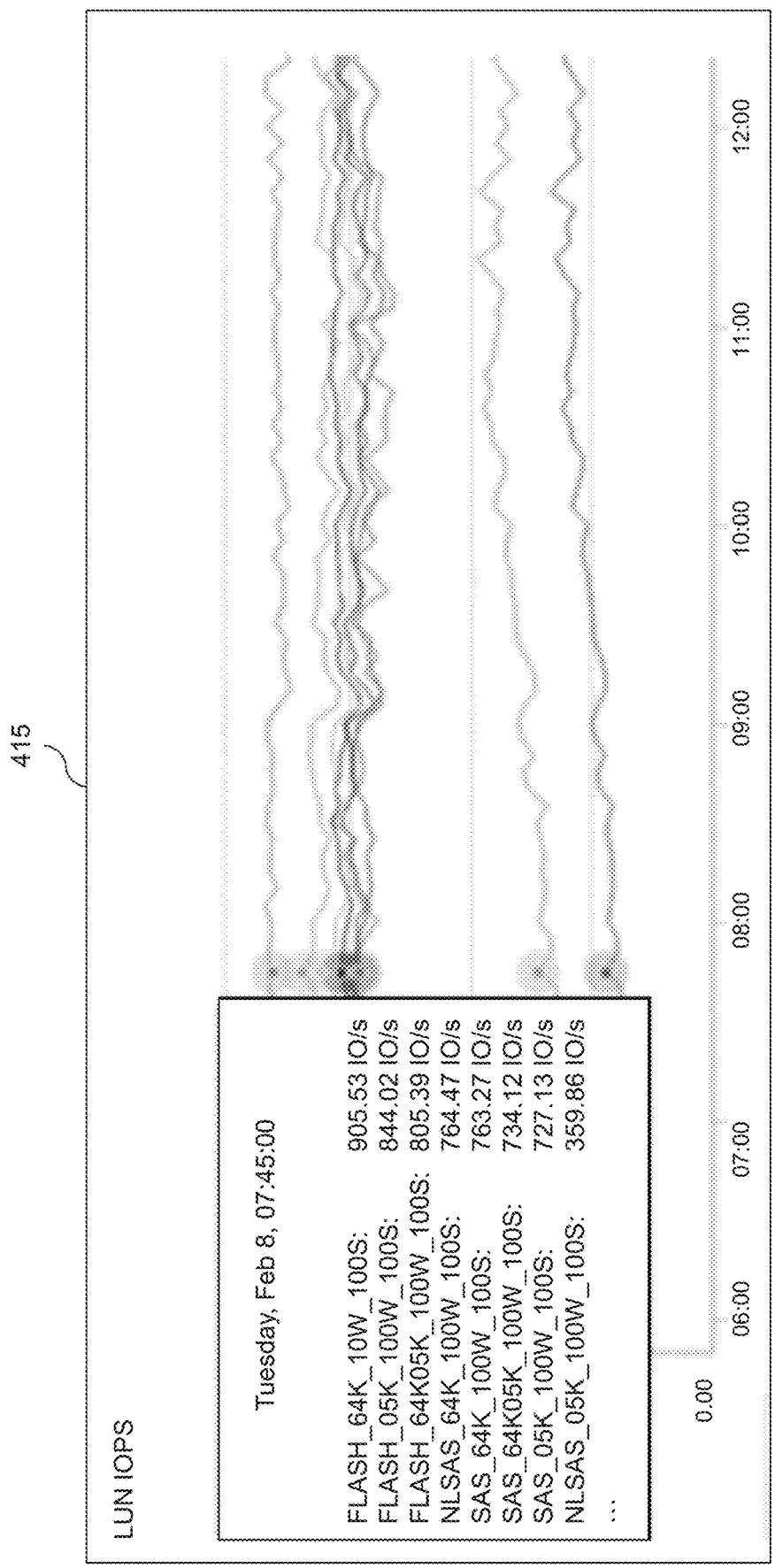
Figure 4E:

FIGS. 4A-4E show a first group (Group 1) with a mix of OLTP logging workloads (e.g., with different IO sizes) creating the same type of storage objects on different storage tiers (e.g., a SAS flash storage tier, a SAS storage tier, and a NL-SAS storage tier). The following IO patterns are loaded: P1, a pure IO pattern of 0.5K_100W_100S (IO size of 512B, read/write ratio of 100% write, and random/sequential ratio of 100% sequential); P2, a pure IO pattern of 64K_100 W_100S (IO size of 64 KB, read/write ratio of 100% write, and random/sequential ratio of 100% sequential); and P3, a mixed IO pattern of 0.5K64K_100W_100S (10 size that is a mix of 512B and 64 KB, read/write ratio of 100% write, and random/sequential ratio of 100% sequential). FIGS. 4A-4D show respective plots 400, 405, 410 and 415 of LUN IO size, LUN bandwidth, LUN response time and LUN IOPS. Each of the plots 400, 405, 410 and 415 shows a set of values for the different metrics at a point in time (Tuesday, February 8th at 07:45:00) for the different IO patterns on the SAS flash, SAS and NL-SAS storage tiers. FIG. 4E shows a table 420 that illustrates the performance metrics collected over a six hour period, along with calculations of the average of each performance criteria for the NL-SAS storage tier. As illustrated, the mixed IO pattern P3 response time is longer than the average of the pure P1 and P2 IO patterns. The IOPS is smaller for the mixed IO pattern P3 than for the average of the pure P1 and P2 IO patterns. The bandwidth for the mixed IO pattern P3 is also less than the average of the pure P1 and P2 IO patterns. Thus, the overall results illustrate that the mixed IO pattern P3 for the NL-SAS storage tier has lower performance than the average of the pure P1 and P2 IO patterns.

Figure 5A:
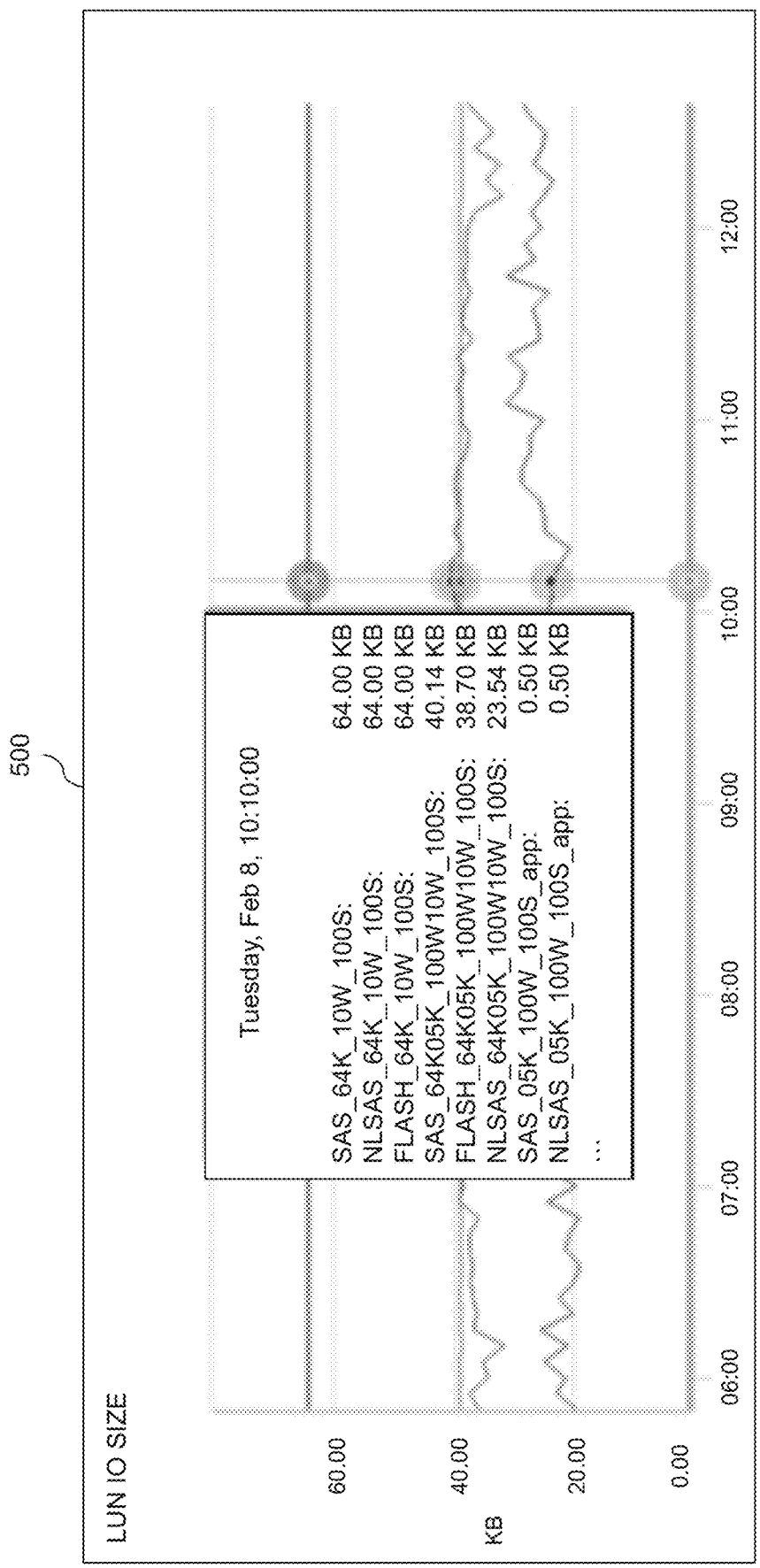
FIGS. 5A-5E show plots and a table of different performance metrics for another mix of input/output patterns on different storage tiers in an illustrative embodiment.
Figure 5B:
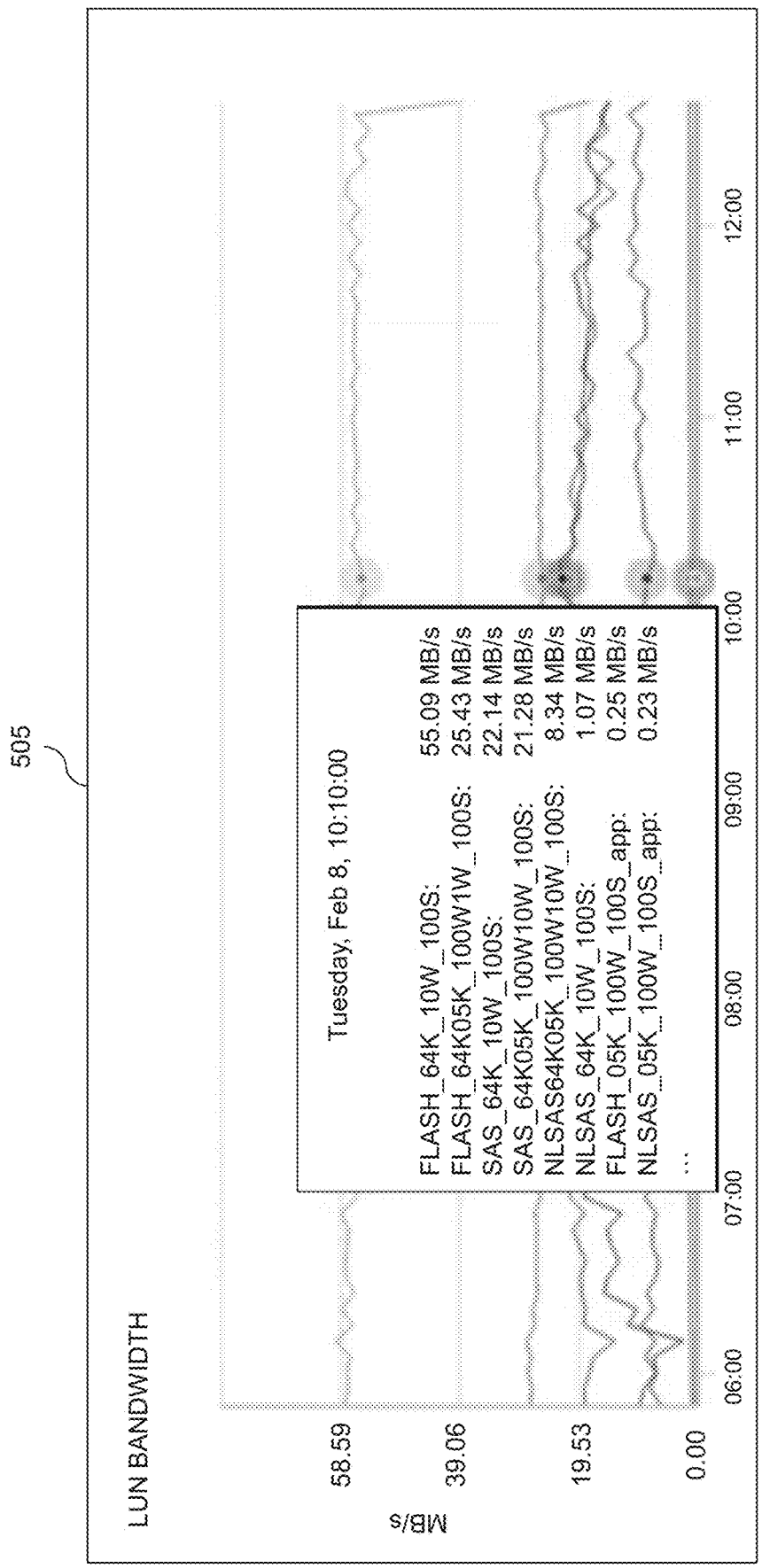
Figure 5C:
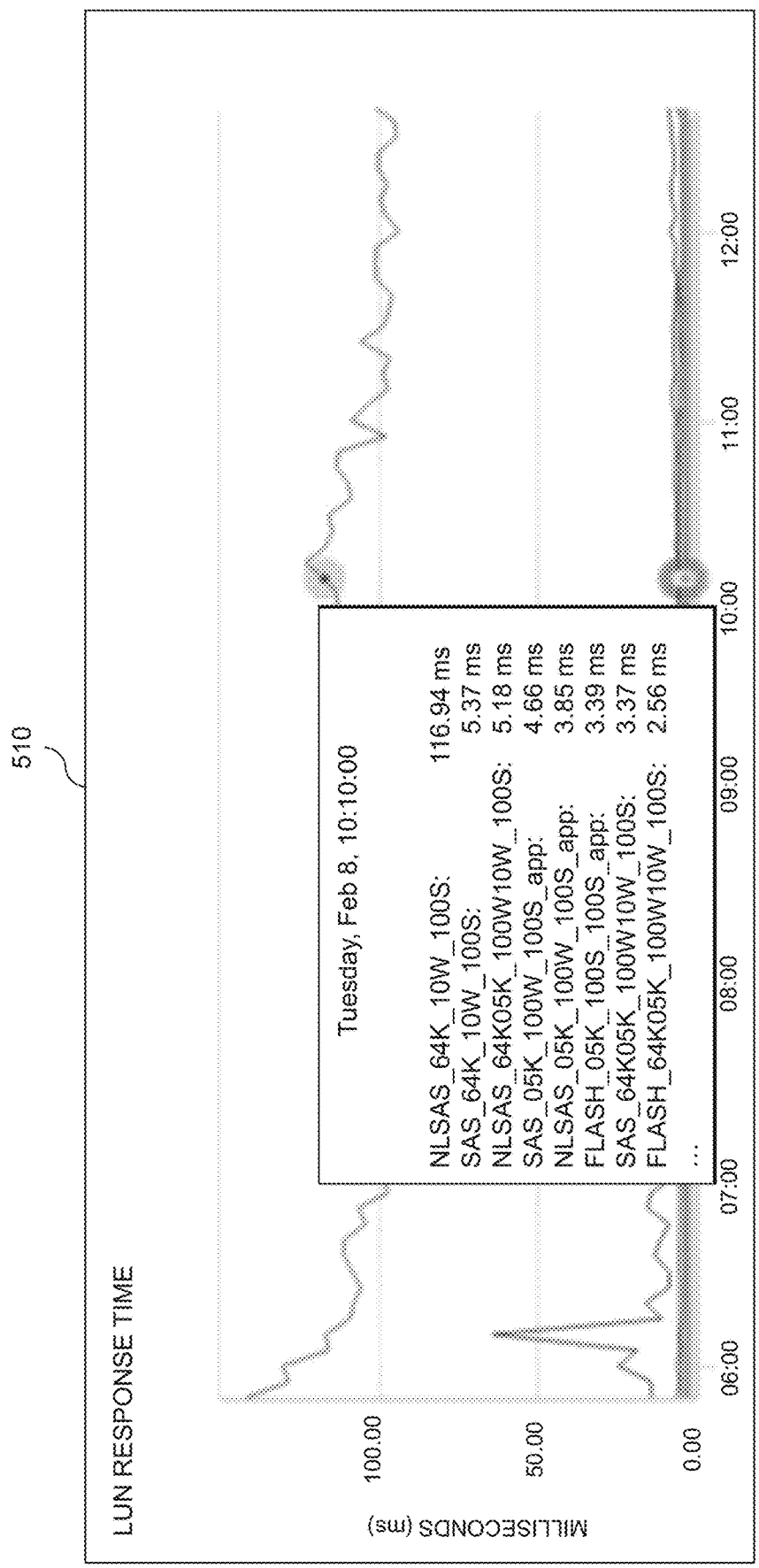
Figure 5D:
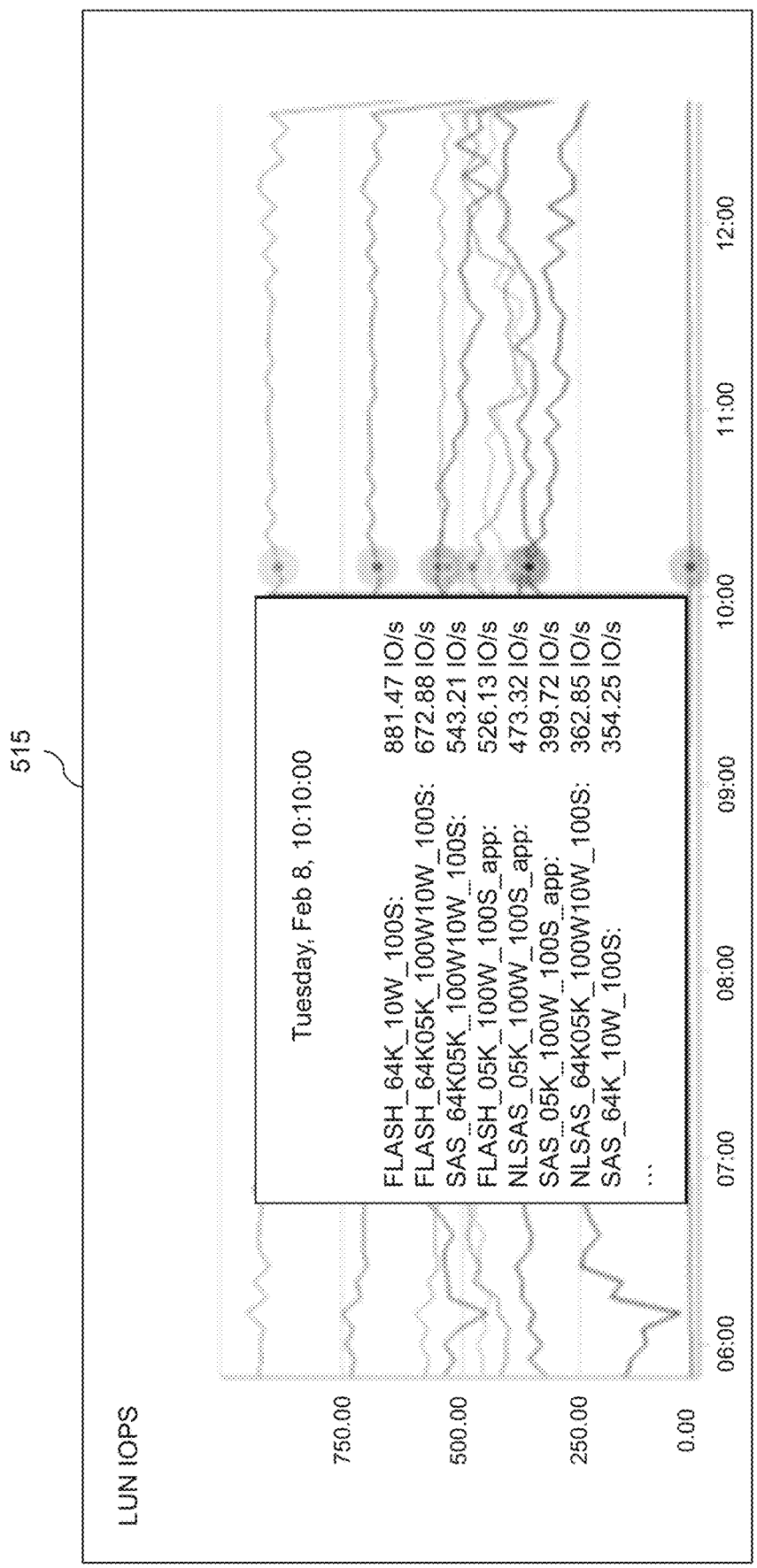
Figure 5E:

FIGS. 5A-5E show a second group (Group 2) with a mix of OLTP logging and media streaming application workloads. Here, the following IO patterns are loaded: P1, a pure IO pattern of 0.5K_100 W_100S (IO size of 512B, read/write ratio of 100% write, and random/sequential ratio of 100% sequential); P2, a pure IO pattern of 64K_10W_100S (IO size of 64 KB, read/write ratio of 10% write and 90% read, and random/sequential ratio of 100% sequential); and P3, a mixed IO pattern of 0.5K64K_100W_100S (IO size that is a mix of 512B and 64 KB, read/write ratio that is a mix of 100% write and 10% write/90% read, and random/sequential ratio of 100% sequential). FIGS. 5A-5D show respective plots 500, 505, 510 and 515 of LUN 10 size, LUN bandwidth, LUN response time and LUN IOPS. Each of the plots 500, 505, 510 and 515 shows a set of values for the different metrics at a point in time (Tuesday, February 8th at 10:10:00) for the different IO patterns on the SAS flash, SAS and NL-SAS storage tiers. FIG. 5E shows a table 520 that illustrates the performance metrics collected over a six hour period, along with calculations of the average of each performance criteria for the NL-SAS storage tier. As illustrated, the mixed 10 pattern P3 response time is shorter than the average of the pure P1 and P2 IO patterns. The IOPS is larger for the mixed IO pattern P3 than for the average of the pure P1 and P2 IO patterns. The bandwidth for the mixed IO pattern P3 is also greater than the average of the pure P1 and P2 IO patterns. Thus, the overall results illustrate that the mixed IO pattern P3 for the NL-SAS storage tier has higher performance than the average of the pure P1 and P2 IO patterns.

As can be seen from the Group 1 and Group 2 mixes of IO patterns, mixed IO pattern performance is not exactly equal to the average of the associated pure IO patterns' performance. This means that after mixes of IO patterns are flushed to disks or storage devices, there may be different performance impacts. There is thus a need to determine the impact of different mixes of IO patterns on storage system performance (e.g., determining different IO patterns' affinity), and for selecting where to shunt applications or storage workloads based on their IO patterns to improve storage system performance.

In conventional approaches, applications or storage workloads may access the same group of storage drives or devices, and mixes of IO patterns associated with the applications or storage workloads are flushed to the same group of disks or storage devices together. Such approaches suffer from various disadvantages. As detailed above, IO patterns have impact on each other, where some "low affinity" mixes of IO patterns can degrade storage system performance dramatically, while other "high affinity" mixes of IO patterns can improve storage system performance dramatically. Illustrative embodiments provide technical solutions for determining IO pattern affinity, and then arranging applications or storage workloads to different storage drives or storage devices in a storage system accordingly (e.g., in a manner similar to highway vehicle shunting). The technical solutions described herein provide approaches for analyzing mixed IO pattern performance, calculating mixed IO patterns affinity, evaluating IO pattern mix affinity degree, and determining whether IO patterns should be used for the same group of disks or storage devices or not based on the evaluated affinity degree.

IO patterns have different performance characteristics when alone and mixed with one another. The technical solutions described herein provide techniques for measuring IO patterns' affinity from a performance point of view, where various performance factors may be considered including response time, IOPS and bandwidth. The affinity degree among mixes of IO patterns is used to determine the performance impact when IO patterns are mixed. Qualitative analysis is enabled to determine whether storage system performance increases or decreases when IO patterns are mixed. Quantitative analysis is enabled to calculate the quantity of the increase or decrease in storage system performance when IO patterns are mixed. IO flows (e.g., applications or other storage workloads) are then shunted according to the affinity degree to improve storage system performance.

The following notation is used in the description below:

N denotes a number of types of IO patterns;

$P_k$ denotes a specific IO pattern, where $1<k<N+1$, $N>2$, and where the last IO pattern $P_{N+1}$ is a mix of the preceding N IO patterns;

$C_{R,k}$ denotes the IO pattern $P_k$ performance criteria of response time, where for performance evaluation $C_{R,k}$ is a reverse indicator;

$NC_{R,k}$ denotes the normalization of response time performance criteria for IO pattern $P_k$, where $$NC_{R,k} = \frac{1/C_{R,k}}{\sum_{k=1}^{N+1} 1/C_{R,k}};$$

Avg_$NC_{R,k}$ denotes the average of response time performance criteria for N IO patterns, where $$\text{Avg\_NC}_{R,k} = \frac{\sum_{k=1}^{N+1} NC_{R,k}}{K};$$

$C_{I,k}$ denotes the IO pattern $P_k$ performance criteria of IOPS;

$NC_{I,k}$ denotes the normalization of the IOPS performance criteria, where $$NC_{I,k} = \frac{c_{I,k}}{\sum_{k=1}^{N+1} C_{I,k}};$$

Avg_$NC_{I,k}$ denotes the average of the IOPS performance criteria for N IO patterns, where $$\text{Avg\_NC}_{I,k} = \frac{\sum_{k=1}^{N+1} NC_{I,k}}{K};$$

$C_{B,k}$ denotes the IO pattern $P_k$ performance criteria of bandwidth;

$NC_{B,k}$ denotes the normalization of the bandwidth performance criteria for IO pattern $P_k$, where $$NC_{B,k} = \frac{c_{B,k}}{\sum_{k=1}^{N+1} c_{B,k}};$$

Avg_$NC_{B,k}$ denotes the average of the bandwidth performance criteria for N IO patterns, where $$\text{Avg\_NC}_{B,k} = \frac{\sum_{k=1}^{N} NC_{B,k}}{N};$$

$L_{mix}$ denotes the mixed IO pattern location in the three performance dimensions, where $L_{mix} = \{NC_{R,N+1}, NC_{I,N+1}, NC_{B,N+1}\}$;

$L_{avg}$ denotes the average of N IO patterns location in the three performance dimensions, where $L_{avg} = \{\text{Avg\_NC}_{R,k}, \text{Avg\_NC}_{I,k}, \text{Avg\_NC}_{B,k}\}$;

$D_r$ denotes the related distance of the mixed IO pattern P N+1 location and the average of N IO patterns $[P_1 \ldots P_N]$ location, where:

$$D_r = L_{mix} L_{avg} = (NC_{R,N+1} - \text{Avg\_NC}_{R,k}) + (NC_{I,N+1} - \text{Avg\_NC}_{I,k})(NC_{B,N+1} - \text{Avg\_NC}_{B,k})$$

and if the value of $D_r < 0$ then the mixed IO pattern performance is degraded, and if the value of $D_r \geq 0$ then the mixed IO pattern performance is improved;

$D_e$ denotes the Euclidean distance of the mixed IO pattern $P_{N+1}$'s performance with the average performance of patterns $[P_1 \ldots P_N]$ in the three performance dimensions (response time, IOPS, bandwidth), where:

$$D_e = \text{square}(L_{mix} - L_{avg})$$
$$= \sqrt{(NC_{R,N+1} - \text{Avg\_NC}_{R,k})^2 + (NC_{I,N+1} - \text{Avg\_NC}_{I,k})^2 + (NC_{B,N+1} - \text{Avg\_NC}_{B,k})^2}$$

and the value of $D_e$ is used to measure the quantity of the increase or decrease in the mixed IO pattern $P_{N+1}$'s performance; and denotes that acceptable threshold of performance increase or decrease after IO patterns are mixed.

Storage system IO performance can be measured by several criteria. In the description below, it is assumed that response time, IOPS and bandwidth performance criteria are used to evaluate IO pattern performance. Assume that there are N types of IO patterns, where N>2. P k is used to represent a specific "pure" (e.g., non-mixed) IO pattern, where 1<k<N+1. P N+1 is used to represent the "mix" of the N pure IO patterns. $C_{R,k}$ represents the IO pattern $P_k$'s response time performance criteria, where for performance evaluation $C_{R,k}$ is a reverse indicator. $C_{I,k}$ represents the IO pattern $P_k$'s IOPS performance criteria. $C_{B,k}$ represents the IO pattern $P_k$'s bandwidth performance criteria. As these performance criteria have different units, the values for each criterion are normalized to measure the mixed IO pattern's performance result.

The three dimensions of the performance criteria for each IO pattern $P_k$ are normalized. Considering that the response time performance criteria is a reverse indicator, to conveniently analyze the performance, the reciprocal of $C_{R,k}$ is taken before normalization. The normalization of response time performance criteria for IO pattern $P_k$ is determined according to the following equation:

$$NC_{R,k} = \frac{1/C_{R,k}}{\sum_{k=1}^{N+1} 1/C_{R,k}}$$

The normalization of the IOPS performance criteria for IO pattern $P_k$ is determined according to the following equation:

$$NC_{I,k} = \frac{C_{I,k}}{\sum_{k=1}^{N+1} C_{I,k}}$$

The normalization of the bandwidth performance criteria for IO pattern $P_k$ is determined according to the following equation:

$$NC_{B,k} = \frac{C_{B,k}}{\sum_{k=1}^{N+1} C_{B,k}}$$

The average performance levels of the N types of pure IO patterns ($[P_1 \ldots P_N]$) are then calculated for each of the performance criteria. The average of the response time performance criteria is determined according to the following equation:

$$\text{Avg\_NC}_{R,k} = \frac{\sum_{k=1}^{N} NC_{R,k}}{N}$$

The average of the IOPS performance criteria is determined according to the following equation:

$$\text{Avg\_NC}_{I,k} = \frac{\sum_{k=1}^{N} NC_{I,k}}{N}$$

The average of the bandwidth performance criteria is determined according to the following equation:

$$Avg_{NC_{B,k}} = \frac{\sum_{k=1}^{N} NC_{B,k}}{N}$$

The average performance level of the N types of pure IO patterns can thus be represented as:

$$L_{avg} = \{\text{Avg\_NC}_{R,k}, \text{Avg\_NC}_{I,k}, \text{Avg\_NC}_{B,k}\} = \left\{ \frac{\sum_{k=1}^{N} NC_{R,k}}{N}, \frac{\sum_{k=1}^{N} NC_{I,k}}{N}, \frac{\sum_{k=1}^{N} NC_{B,k}}{N} \right\}$$

The performance level of the mixed IO pattern P N+1 is determined according to the following equation:

$$L_{mix} = \{NC_{R,N+1}, NC_{I,N+1}, NC_{B,N+1}\} = \left\{ \frac{1/C_{R,N+1}}{\sum_{k=1}^{N+1} 1/C_{R,k}}, \frac{C_{I,k}}{\sum_{k=1}^{N+1} C_{I,k}}, \frac{C_{B,k}}{\sum_{k=1}^{N+1} C_{B,k}} \right\}$$

The mixed IO patterns' affinity is then calculated. The three performance criteria (response time, TOPS and bandwidth) may be considered as a three-dimensional space, where L avg and $L_{mix}$ are two points in the three-dimensional space. The related distance of the mixed IO patterns' $L_{mix}$ and $L_{avg}$ values is determined according to the following equation:

$$D_r = L_{mix} - L_{avg} = (NC_{R,N+1} - \text{Avg\_}NC_{R,k}) + (NC_{I,N+1} - \text{Avg\_}NC_{I,k}) + (NC_{B,N+1} - \text{Avg\_}NC_{B,k})$$

If the value of $D_r<0$, then the mixed IO patterns' performance is degraded. If the value of $D_r>0$, then the mixed IO patterns' performance is improved. If the value of $D_r=0$, then the mixed IO patterns' performance has no effect on each other. The Euclidean distance of the mixed IO patterns' performance L mix with the average performance L avg in the three performance dimensions (response time, IOPS and bandwidth) is determined according to the following equation:

$$D_e = \text{square}(L_{mix} - L_{avg})$$
$$= \sqrt{(NC_{R,N+1} - \text{Avg\_}NC_{R,k})^2 + (NC_{I,N+1} - \text{Avg\_}NC_{I,k})^2 + (NC_{B,N+1} - \text{Avg\_}NC_{B,k})^2}$$

The value of $D_r$ is used to evaluate the performance increase or decrease after the IO patterns are mixed. The value of $D_e$ is used to measure the performance increase or decrease quantity after the IO patterns are mixed.

A guide is then generated for shunting applications or storage workloads based on the affinity of their IO patterns. The $P=[P_1 \ldots P_N]$ IO patterns affinity can be evaluated by the $[D_r, D_e]$ together. Assume 0 as the acceptable threshold of performance increase or decrease after patterns are mixed.

Figure 6A:
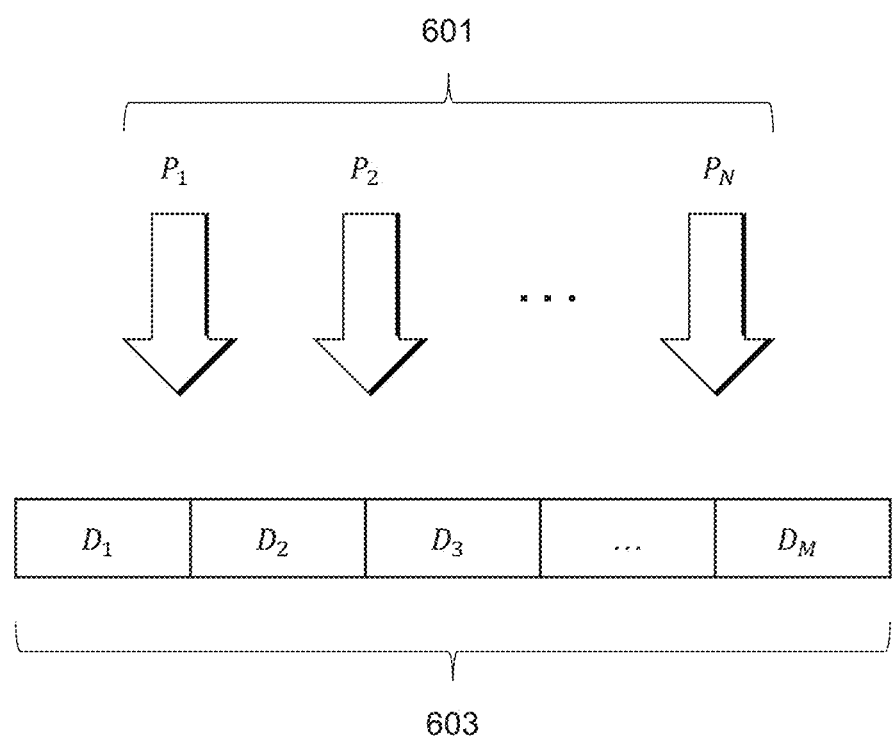
FIGS. 6A and 6B show different allocations of a set of input/output patterns to groups of storage devices in an illustrative embodiment.
Figure 6B:
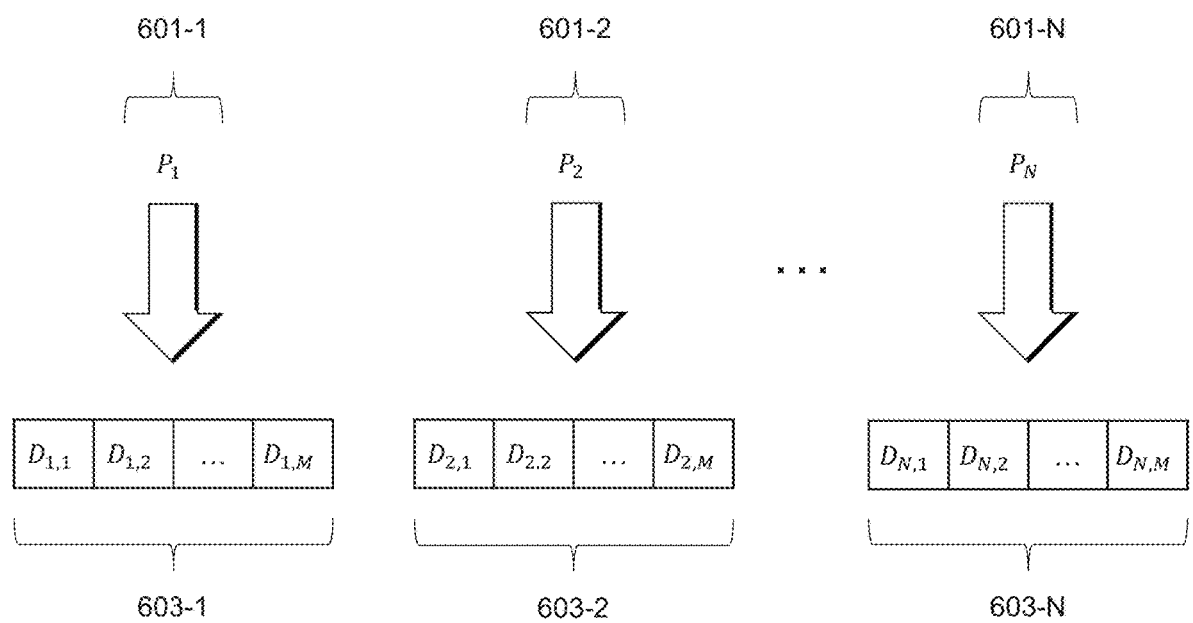

1. If $D_e<\theta$, the IO patterns $[P_1 \ldots P_N]$ do not have a significant performance impact on each other when mixed, and the affinity is neutral so there is no need for a special arrangement.
2. If $D_e>\theta$ and $D_r>0$, the IO patterns $[P_1 \ldots P_N]$ have a significant positive performance impact on each other when mixed, and the affinity is positive. Thus, the IO patterns are suitable to be mixed to the same group of disks or storage devices, since the mixed IO performance is increased. This is illustrated in FIG. 6A, where the mix of IO patterns $[P_1 \ldots P_N]$ 601 are directed to the same group of disks or storage devices $[D_1, D_2, D_3, \ldots D_M]$ 603.
3. If $D_e>0$ and $D_r<0$, the IO patterns $[P_1 \ldots P_N]$ have a significant negative performance impact on each other when mixed, and the affinity is negative. Thus, the IO patterns are not suitable to be mixed to the same group of disks or storage devices. The IO patterns P should instead be shunted to different groups of disks or storage devices to reduce the performance degradation. This is illustrated in FIG. 6B, where different ones of the IO patterns $P_1$ 601-1, $P_2$ 601-2, ... $P_N$ 601-N are shunted to different groups of disks or storage devices $[D_{1,1}, D_{1,2}, \ldots D_{1,M}]$ 603-1, $[D_{2,1}, D_{2,2}, \ldots D_{2,M}]$ 603-2, ... $[D_{N,1}, D_{N,2}, \ldots D_{N,M}]$ 603-N.

This analysis method can be leveraged by a clustered storage system to improve IO performance, by arranging those applications or storage workloads whose IO patterns have positive affinity to the same storage system or array within the clustered storage system, and arranging those applications or storage workloads whose IO patterns have negative affinity to different storage systems or arrays within the clustered storage system. This analysis method can also or alternatively be leveraged within an individual storage system or storage array (e.g., including within each storage system or storage array that is part of a clustered storage system), to arrange applications or workloads among the storage devices thereof based on whether their 10 patterns have positive or negative affinity.

Figure 7:
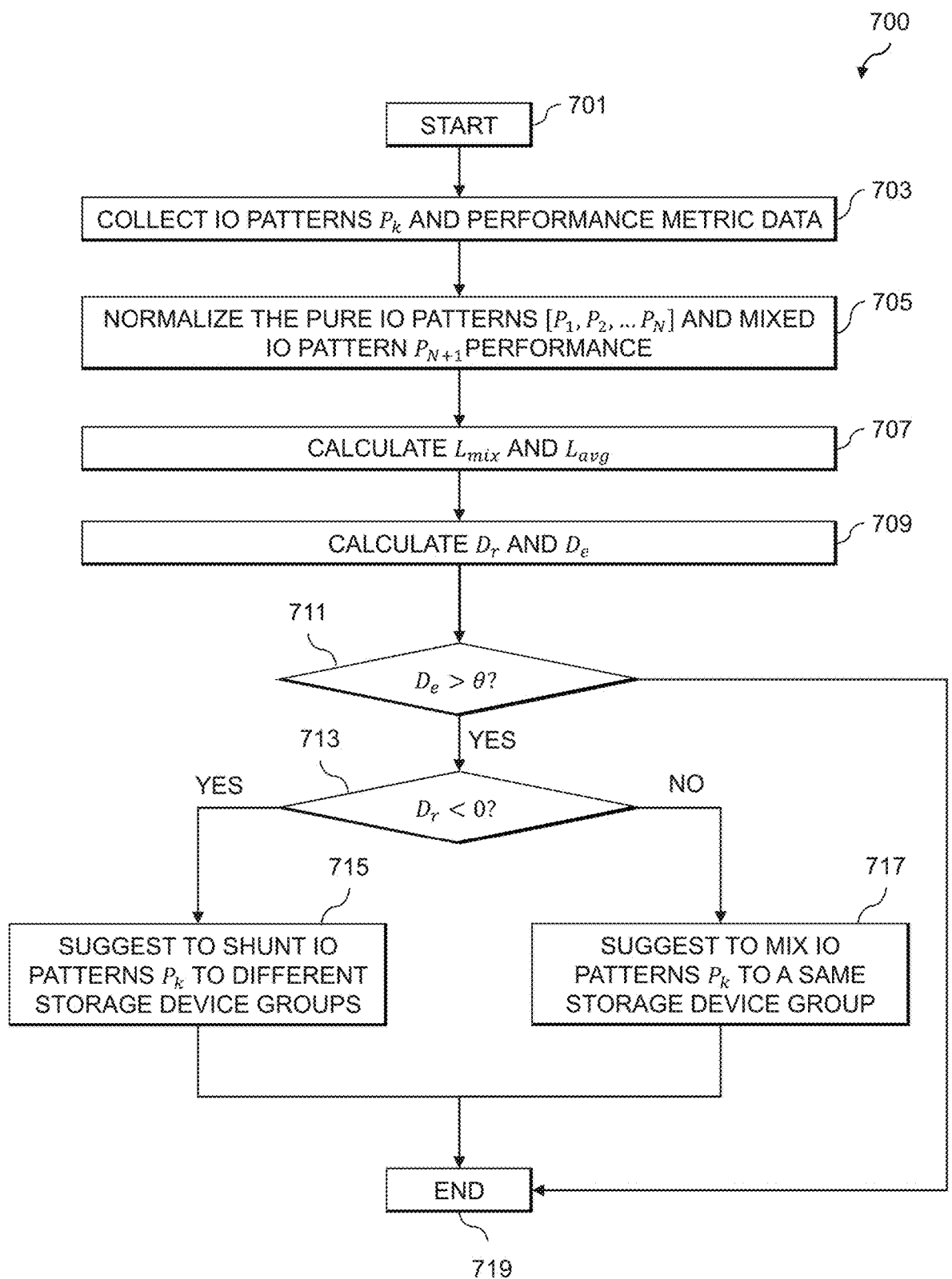
FIG. 7 shows a process flow for generating recommendations for storage workload allocation based on input/output pattern affinity in an illustrative embodiment.

FIG. 7 shows a process flow 700 for determining how to arrange applications or workloads among storage device groups in a storage system based on the affinity of their associated IO patterns. The process flow 700 starts in step 701, and in step 703 IO patterns $P_k$ and their associated performance metric data (e.g., response time, IOPS, bandwidth) are collected. In step 705, the pure IO patterns $[P_1, P_2, \ldots P_N]$ and mixed IO pattern P N+1 performance are normalized. The $L_{mix}$ and $L_{avg}$ values are calculated in step 707, and the $D_r$ and $D_e$ values are calculated in step 709. In step 711, a determination is made as to whether $D_e>\theta$. If the result of the step 711 determination is yes, the process flow 700 proceeds to step 713. If the result of the step 711 determination is no, the process flow 700 ends in step 719. In step 713, a determination is made as to whether $D_r<0$. If the result of the step 713 determination is yes, then a suggestion is made to shunt the IO patterns $P_k$ to different storage device groups in step 715. If the result of the step 713 determination is no, then a suggestion is made to shunt the IO patterns $P_k$ to a same storage device group in step 717. Following steps 715 and 717, the process flow 700 ends in step 719.

The FIG. 7 process flow 700 was run using the example groups of IO patterns described above with respect to FIGS. 4E and 5E (e.g., the Group 1 and Group 2 IO patterns). Group 1 is a mix of IO patterns loaded to NL-SAS drives. $P_{k=1}$ is NLSAS_05K_100 W_100S, $P_k=2$ is NLSAS_64K_100 W_100S, and $P_k=3$ (the is NLSAS_0.5K64K_100 W_100S. Group 2 is also a mix of IO patterns loaded to NL-SAS drives. P k=1 is NLSAS_05K_100 W_100S, $P_k=2$ is NLSAS_64K_10W_100S, and $P_{k=3}$ (the L mix) is NLSAS_0.5K64K_100W100W_100S. Here, it is assumed that the acceptable threshold 0=0.2 of performance increase or decrease after IO patterns are mixed.

Figure 8A:
FIGS. 8A and 8B show a table and plot of input/output pattern affinity metrics for a mix of input/output patterns in an illustrative embodiment.
Figure 8B:
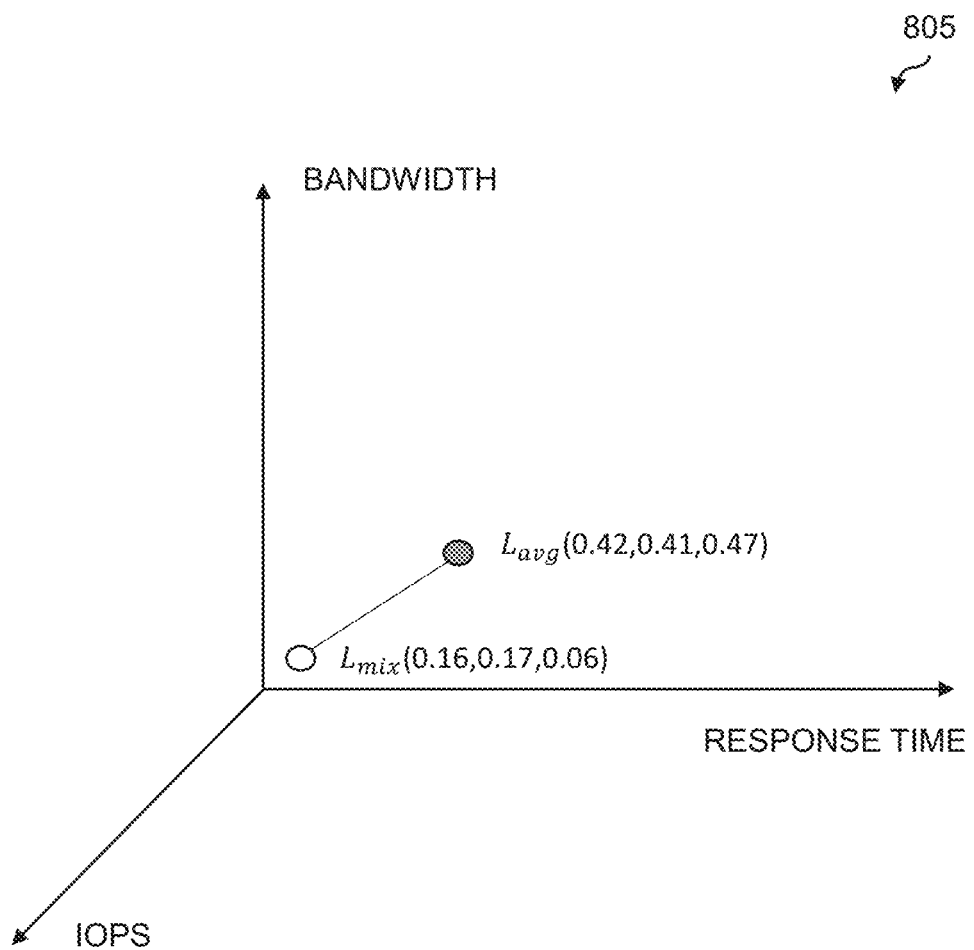

FIG. 8A shows a table 800, showing the three performance dimensions (e.g., the inverse of response time, IOPS and bandwidth) for the Group 1 IO patterns after normalization. As can be seen from the table 800, the value of $D_r<0$, such that the IO patterns 0.5K_100 W_100S and 64K_100 W_100S have negative affinity, and the quantity D e=0.54612045 is bigger than 0. Thus, a recommendation is made to shunt these two types of IO patterns to different groups of storage devices (or different storage systems altogether) to reduce degradation of IO performance. FIG. 8B shows a plot 805 illustrating the locations and relationship of the $L_{mix}$ and $L_{avg}$ values in the three-dimensional performance criteria space.

Figure 9B:
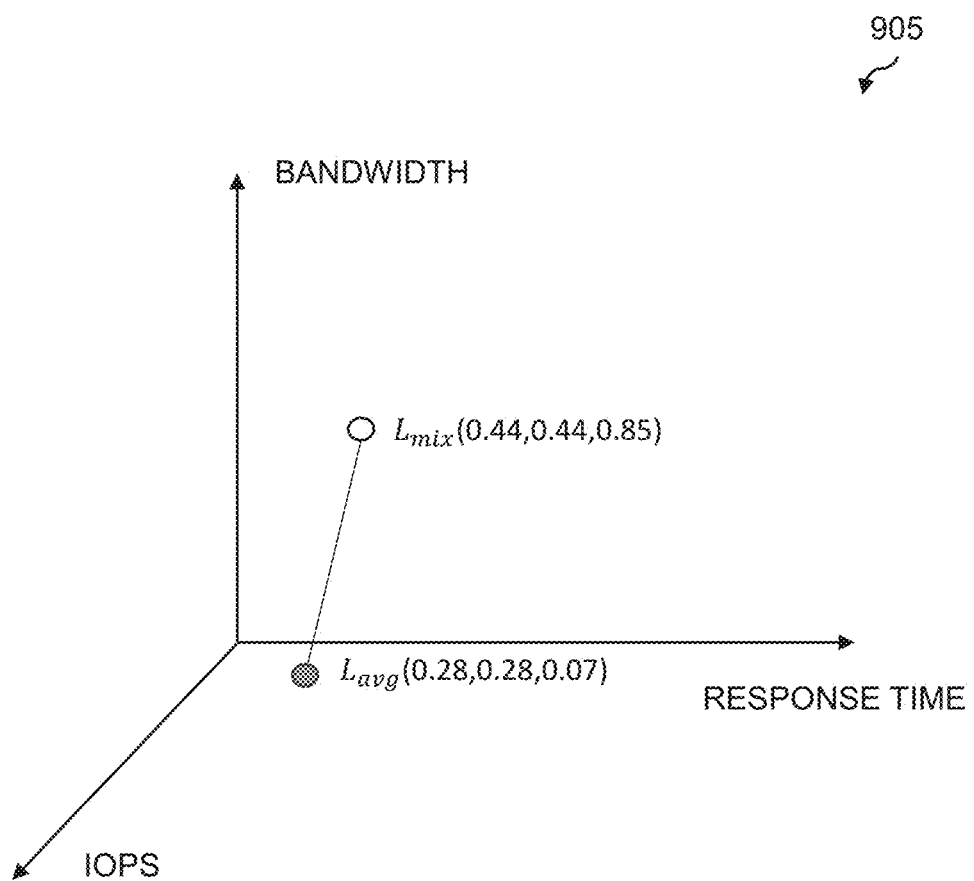

FIG. 9A shows a table 900, showing the three performance dimensions (e.g., the inverse of response time, IOPS and bandwidth) for the Group 2 IO patterns after normalization. As can be seen from the table 900, the value of $D_r>0$, such that the IO patterns 0.5K_100 W_100S and 64K_100W_100S have positive affinity, and the quantity D e=0.80692 is bigger than 0. Thus, a recommendation is made to shunt these two types of IO patterns to a same group of storage devices (or a same storage system) to improve IO performance. FIG. 9B shows a plot 905 illustrating the locations and relationship of the $L_{mix}$ and $L_{avg}$ values in the three-dimensional performance criteria space.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for storage workload allocation based at least in part on IO pattern affinity calculations will now be described in greater detail with reference to FIGS. 10 and 11. Although described in the context of system 100, these platforms may also be used to implement at least portions of other information processing systems in other embodiments.

Figure 10:
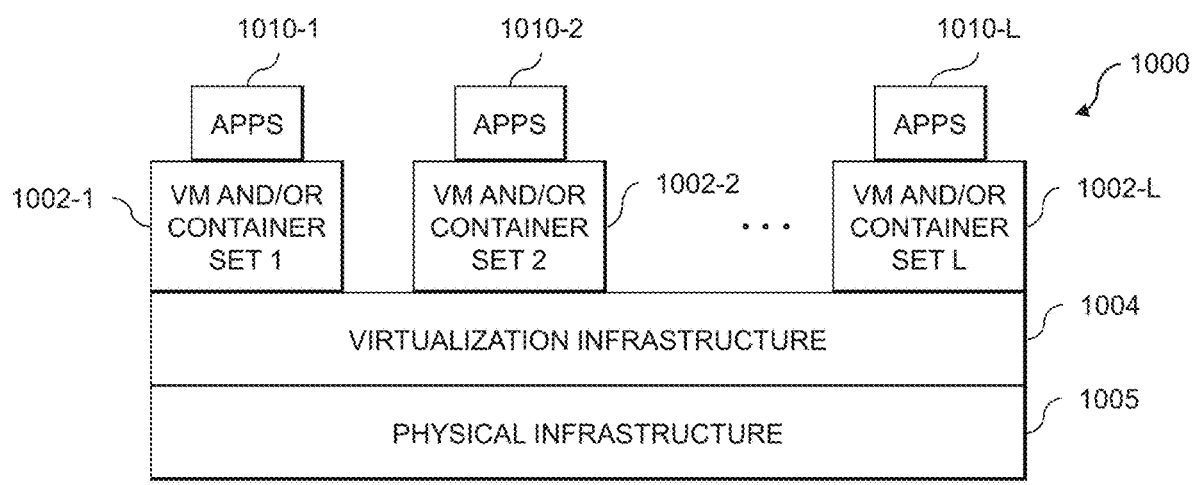
FIGS. 10 and 11 show examples of processing platforms that may be utilized to implement at least a portion of an information processing system in illustrative embodiments.
Figure 11:
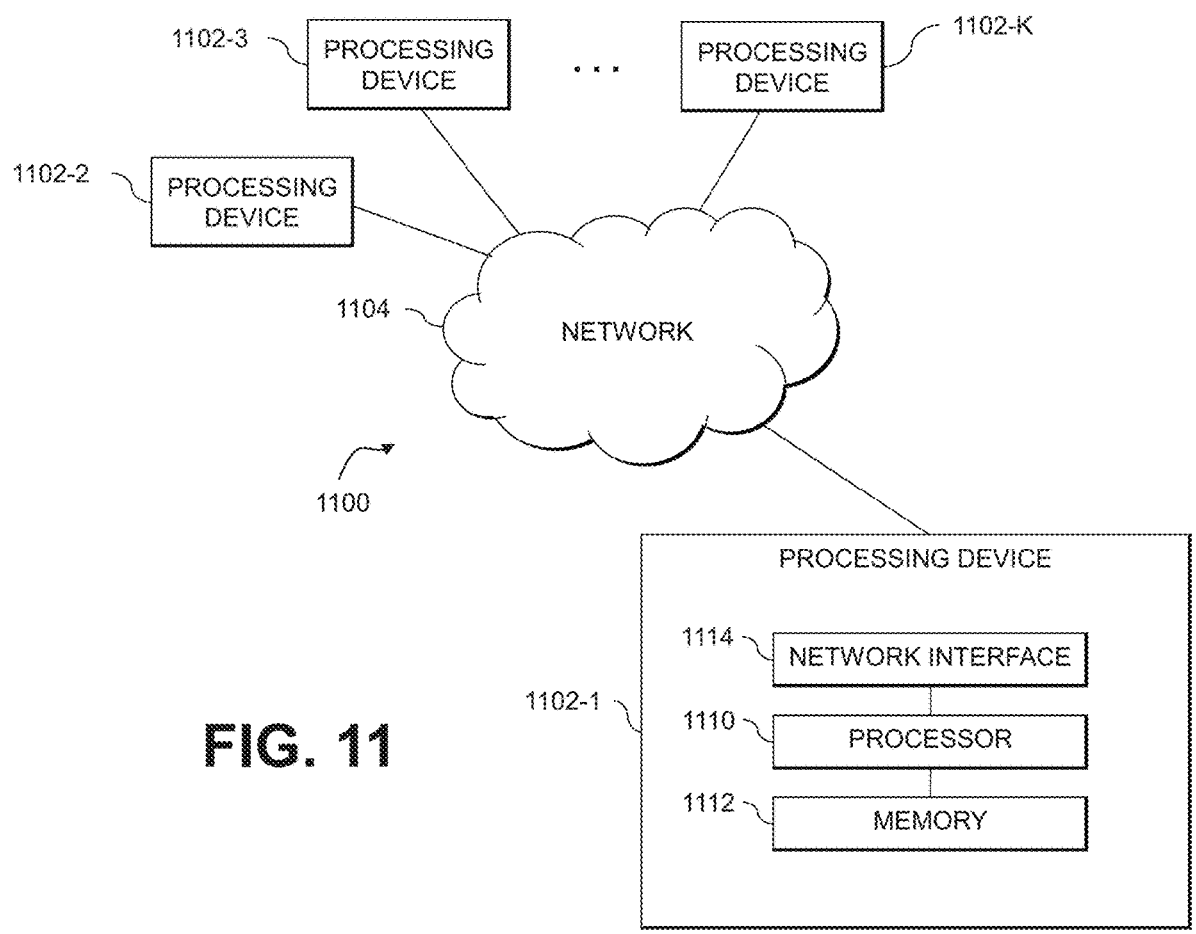

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for storage workload allocation based at least in part on IO pattern affinity calculations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, IO patterns, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
identifying a set of storage workloads to be run on a storage system, the storage system comprising a plurality of storage devices;
determining a mix of input/output patterns associated with two or more storage workloads in the identified set of storage workloads, the mix of input/output patterns comprising a first set of one or more input/output patterns characterizing types of input/output operations performed by a first one of the two or more storage workloads in the identified set of storage workloads and at least a second set of one or more input/output patterns characterizing types of input/output operations performed by a second one of the two or more storage workloads in the identified set of storage workloads;
calculating an affinity metric for the mix of input/output patterns associated with the two or more storage workloads in the identified set of storage workloads, the calculated affinity metric characterizing a difference between performance metrics for (i) the mix of input/output patterns running concurrently and (ii) the first and second sets of one or more input/output patterns running individually; and
allocating the two or more storage workloads in the identified set of storage workloads to one or more of the plurality of storage devices of the storage system based at least in part on the calculated affinity metric.

2. The apparatus of claim 1 wherein a given input/output pattern associated with a given one of the two or more storage workloads in the identified set of storage workloads characterizes:
a size of storage objects stored by the given storage workload;
a ratio of read operations to write operations for storage objects stored by the given storage workload; and
a ratio of sequential input/output operations to random input/output operations involving storage objects stored by the given storage workload.

3. The apparatus of claim 1 wherein calculating the affinity metric comprises:
determining normalized values for two or more different types of performance criteria for the mix of input/output patterns;
determining normalized values for each of the input/output patterns in the mix of input/output patterns; and
determining averages of the normalized values for the two or more different types of performance criteria for each of the input/output patterns in the mix of input/output patterns.

4. The apparatus of claim 3 wherein the two or more different types of performance criteria comprise: response time, input/output operations per second and bandwidth.

5. The apparatus of claim 3 wherein calculating the affinity metric further comprises computing a distance between:
the normalized values for the two or more different types of performance criteria for the mix of input/output patterns; and
the determined averages of the normalized values for the two or more different types of performance criteria for each of the input/output patterns in the mix of input/output patterns.

6. The apparatus of claim 5 wherein the computed distance comprises a distance between a first point in an N-dimensional space corresponding to the normalized values for the two or more different types of performance criteria for the mix of input/output patterns and a second point in the N-dimensional space corresponding to the determined averages of the normalized values for the two or more different types of performance criteria for each of the input/output patterns in the mix of input/output patterns, where N is the number of the two or more different types of performance criteria.

7. The apparatus of claim 5 wherein the computed distance comprises a Euclidean distance metric.

8. The apparatus of claim 1 wherein the calculated affinity metric comprises:
a first component characterizing whether the mix of input/output patterns provides a performance increase or a performance decrease; and
a second component characterizing a quantity of the performance increase or the performance decrease.

9. The apparatus of claim 8 wherein allocating the two or more storage workloads in the identified set of storage workloads to the plurality of storage devices of the storage system based at least in part on the calculated affinity metric comprises determining whether to modify an existing allocation of the two or more storage workloads in the identified set of storage workloads based at least in part on whether the second component of the calculated affinity metric exceeds a designated threshold.

10. The apparatus of claim 9 wherein allocating the two or more storage workloads in the identified set of storage workloads to the plurality of storage devices of the storage system based at least in part on the calculated affinity metric further comprises, responsive to determining that the second component of the calculated affinity metric exceeds the designated threshold and the first component of the calculated affinity metric indicates that the mix of input/output patterns provides the performance increase, modifying the existing allocation of the two or more storage workloads in the identified set of storage workloads to allocate the two or more storage workloads in the identified set of storage workloads to a same subset of the plurality of storage devices of the storage system.

11. The apparatus of claim 9 wherein allocating the two or more storage workloads in the identified set of storage workloads to the plurality of storage devices of the storage system based at least in part on the calculated affinity metric further comprises, responsive to determining that the second component of the calculated affinity metric exceeds the designated threshold and the first component of the calculated affinity metric indicates that the mix of input/output patterns provides the performance decrease, modifying the existing allocation of the two or more storage workloads in the identified set of storage workloads to allocate the two or more storage workloads in the identified set of storage workloads to two or more different subsets of the plurality of storage devices of the storage system.

12. The apparatus of claim 9 wherein allocating the two or more storage workloads in the identified set of storage workloads to the plurality of storage devices of the storage system based at least in part on the calculated affinity metric comprises, responsive to determining that the second component of the calculated affinity metric does not exceed the designated threshold, maintaining the existing allocation of the two or more storage workloads in the identified set of storage workloads.

13. The apparatus of claim 1 wherein the plurality of storage devices of the storage system are arranged in two or more storage tiers, and wherein allocating the two or more storage workloads in the identified set of storage workloads to the plurality of storage devices of the storage system based at least in part on the calculated affinity metric comprises selecting whether to allocate the two or more storage workloads in the identified set of storage workloads to the same or different ones of the two or more storage tiers.

14. The apparatus of claim 1 wherein the storage system comprises a clustered storage system comprising two or more storage arrays, and wherein allocating the two or more storage workloads in the identified set of storage workloads to the plurality of storage devices of the storage system based at least in part on the calculated affinity metric comprises selecting whether to allocate the two or more storage workloads in the identified set of storage workloads to the same or different ones of the two or more storage arrays in the clustered storage system.

15. A computer program product comprising a non-transitory processor-readable storage medium having stored therein program code of one or more software programs, wherein the program code when executed by at least one processing device causes the at least one processing device to perform steps of:
identifying a set of storage workloads to be run on a storage system, the storage system comprising a plurality of storage devices;
determining a mix of input/output patterns associated with two or more storage workloads in the identified set of storage workloads, the mix of input/output patterns comprising a first set of one or more input/output patterns characterizing types of input/output operations performed by a first one of the two or more storage workloads in the identified set of storage workloads and at least a second set of one or more input/output patterns characterizing types of input/output operations performed by a second one of the two or more storage workloads in the identified set of storage workloads;
calculating an affinity metric for the mix of input/output patterns associated with the two or more storage workloads in the identified set of storage workloads, the calculated affinity metric characterizing a difference between performance metrics for (i) the mix of input/output patterns running concurrently and (ii) the first and second sets of one or more input/output patterns running individually; and
allocating the two or more storage workloads in the identified set of storage workloads to one or more of the plurality of storage devices of the storage system based at least in part on the calculated affinity metric.

16. The computer program product of claim 15 wherein calculating the affinity metric comprises:
determining normalized values for two or more different types of performance criteria for the mix of input/output patterns;
determining normalized values for each of the input/output patterns in the mix of input/output patterns; and
determining averages of the normalized values for the two or more different types of performance criteria for each of the input/output patterns in the mix of input/output patterns.

17. The computer program product of claim 16 wherein calculating the affinity metric further comprises computing a distance between:
the normalized values for the two or more different types of performance criteria for the mix of input/output patterns; and
the determined averages of the normalized values for the two or more different types of performance criteria for each of the input/output patterns in the mix of input/output patterns.

18. A method comprising:
identifying a set of storage workloads to be run on a storage system, the storage system comprising a plurality of storage devices;
determining a mix of input/output patterns associated with two or more storage workloads in the identified set of storage workloads, the mix of input/output patterns comprising a first set of one or more input/output patterns characterizing types of input/output operations performed by a first one of the two or more storage workloads in the identified set of storage workloads and at least a second set of one or more input/output patterns characterizing types of input/output operations performed by a second one of the two or more storage workloads in the identified set of storage workloads;
calculating an affinity metric for the mix of input/output patterns associated with the two or more storage workloads in the identified set of storage workloads, the calculated affinity metric characterizing a difference between performance metrics for (i) the mix of input/output patterns running concurrently and (ii) the first and second sets of one or more input/output patterns running individually; and
allocating the two or more storage workloads in the identified set of storage workloads to one or more of the plurality of storage devices of the storage system based at least in part on the calculated affinity metric;
wherein the method is performed by at least one processing device comprising a processor coupled to a memory.

19. The method of claim 18 wherein calculating the affinity metric comprises:
determining normalized values for two or more different types of performance criteria for the mix of input/output patterns;
determining normalized values for each of the input/output patterns in the mix of input/output patterns; and
determining averages of the normalized values for the two or more different types of performance criteria for each of the input/output patterns in the mix of input/output patterns.

20. The method of claim 19 wherein calculating the affinity metric further comprises computing a distance between:

the normalized values for the two or more different types of performance criteria for the mix of input/output patterns; and the determined averages of the normalized values for the two or more different types of performance criteria for each of the input/output patterns in the mix of input/output patterns.

\* \* \* \* \*

UNITED STATES PATENT AND TRADEMARK OFFICE
CERTIFICATE OF CORRECTION

PATENT NO. : 11,914,875 B2
APPLICATION NO. : 17/860188
DATED : February 27, 2024
INVENTOR(S) : Chi Chen et al.

It is certified that error appears in the above-identified patent and that said Letters Patent is hereby corrected as shown below:

On the Title Page

In the item (57) Abstract:
Please delete "determine a mix of input/output (TO) patterns" and insert therefor --determine a mix of input/output (IO) patterns--

In the Specification

Column 3, Lines 1 and 2, please delete "that facilitate input/output (TO) processing" and insert therefor --that facilitate input/output (IO) processing--

Signed and Sealed this
Ninth Day of April, 2024

Katherine Kelly Vidal
*Director of the United States Patent and Trademark Office*